United States Patent
Hiraoka et al.

(10) Patent No.: US 7,623,276 B2
(45) Date of Patent: Nov. 24, 2009

(54) DOCUMENT READER WHEREIN PART OF DOCUMENT FEED PATH IS OPENABLE

(75) Inventors: Shinichiroh Hiraoka, Yamatokoriyama (JP); Hirotoshi Iemura, Nara (JP); Hironori Ogasawara, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 850 days.

(21) Appl. No.: 11/250,557

(22) Filed: Oct. 17, 2005

(65) Prior Publication Data

US 2006/0082842 A1    Apr. 20, 2006

(30) Foreign Application Priority Data

Oct. 18, 2004  (JP) .............................. 2004-303577

(51) Int. Cl.
*H04N 1/04* (2006.01)
(52) U.S. Cl. .................... 358/498; 358/496; 399/124; 399/361; 399/367
(58) Field of Classification Search ......... 358/400–498; 399/19, 21, 118, 124, 361, 364, 367, 374, 399/110; 355/23, 24; 271/3.01, 3.14
See application file for complete search history.

(56) References Cited

U.S. PATENT DOCUMENTS

| | | | | |
|---|---|---|---|---|
| 4,452,525 | A * | 6/1984 | Ogura | 399/19 |
| 6,619,649 | B2 * | 9/2003 | Takamatsu | 271/3.14 |
| 6,640,082 | B2 | 10/2003 | Mitomi | |
| 6,930,805 | B2 * | 8/2005 | Araki et al. | 358/496 |
| 7,202,983 | B2 * | 4/2007 | Yokota et al. | 358/496 |
| 7,212,317 | B2 * | 5/2007 | Ogata | 358/474 |
| 7,379,700 | B2 * | 5/2008 | Iwata | 399/367 |

FOREIGN PATENT DOCUMENTS

| | | |
|---|---|---|
| JP | 9-240886 A | 9/1997 |
| JP | 2002-182437 A | 6/2002 |
| JP | 2003-32438 A | 1/2003 |
| JP | 2003-158609 A | 5/2003 |

* cited by examiner

*Primary Examiner*—Kimberly A Williams
(74) *Attorney, Agent, or Firm*—Birch, Stewart, Kolasch & Birch, LLP

(57) ABSTRACT

A document reader includes an exterior panel covering a region of a document feed path including a second image read position from outside. The document reader also includes a first open/close member forming a region of the exterior panel including a portion opposed to the image read position. The document reader further includes a second open/close member positioned inwardly of the first open/close member to define a region of the document feed path including the image read position. The first and second open/close members are supported at respective different fulcrums for opening/closing movement about respective shafts extending perpendicularly to the document feed direction, thereby shielding the second image read position from extraneous light.

10 Claims, 4 Drawing Sheets

US 7,623,276 B2

DOCUMENT READER WHEREIN PART OF DOCUMENT FEED PATH IS OPENABLE

CROSS REFERENCE

This Nonprovisional application claims priority under 35 U.S.C. § 119(a) on Patent Application No. 2004-303577 filed in Japan on Oct. 18, 2004, the entire contents of which are hereby incorporated by reference.

BACKGROUND OF THE INVENTION

The present invention relates to a document reader configured to feed plural document sheets placed on a document tray one by one and read image information from each of the document sheets.

In recent years, development has been made of a document reader of the type called "single path feeder (SPF)" configured to feed document sheets one by one from a document tray to an image read position through a single document feed path and read image information from each of the document sheets.

Among such SPFs there has been proposed a SPF including two image reading devices and configured to read image information from both sides of a document sheet during one feed of the document sheet through the document feed path, as disclosed in Japanese Patent Laid-Open Publication No. 2002-182437 for example. One example of such a SPF includes both a charge coupled device (CCD) and a contact image sensor (CIS) as image reading devices.

This configuration can increase the double-side reading speed without significantly upsizing the document reader. However, there arise problems that: (1) the use of the two image reading devices having different resolving powers for reading results in a difference in image quality between two image information items read from respective of the both sides of a document sheet; (2) since the focal depth of the CCD is 3 to 5 mm whereas that of the CIS is 0.5 to 1 mm, such a difference in focal depth between the two image reading devices requires that the precision in positioning each document sheet under feeding at the image read position be strictly kept constant and is likely to cause a focusing error between the image information items read; and (3) if the image read positions of respective of the two image reading devices are situated close to each other in order to reduce the size of the device, exposure light at the image read position of one of the image reading devices is received as stray light by the other at its image read position, which results in an unsatisfactory precision in image information reading.

Though the third one of the above-described problems can be avoided by the provision of a stray light preventive member, the first and second problems cannot be solved because they are caused due to the essential difference between the CCD and the CIS.

In attempt to solve these problems, one conventional SPF includes two image reading devices each comprising a CCD. In this SPF, one of the two CCDs is disposed close to the document feed path as a part of a condensing optical system. For this reason, the document feed path is made relatively long. Accordingly, in cases where jamming of document sheets occurs on the document feed path, the jam releasing operation is required to be achieved easily. In view of this requirement, this SPF is configured to be capable of exposing the document feed path to outside.

In order to enable the SPF to expose a region of the document feed path including the image read position of the CCD forming the condensing optical system to outside, a region of an exterior panel of the device including a portion opposed to the image read position need be made openable/closable. In this case it is required that sufficient consideration be given to the shielding of the image read position from extraneous light (stray light) and the keeping of a constant precision in positioning a document sheet.

That is, it is required that: the SPF prevent extraneous light from reaching the image read position when the open/close portion of the exterior panel is closed; and the distance between a member supporting a document sheet at the image read position and the CCD agree to the designed value.

A feature of the present invention is to provide a document reader including an exterior panel having an open/close portion facing a region of the document feed path including an image read position, the open/close portion having a double structure comprising two members configured to open and close about respective fulcrums, thereby realizing the shielding of the image read position from extraneous light and the keeping of a constant precision in positioning a document sheet.

SUMMARY OF THE INVENTION

According to the present invention, there is provided a document reader comprising: a document tray for receiving thereon document sheets to be subjected to image information reading therefrom; an ejecting tray for receiving the document sheets after the image information reading therefrom; a document feed path extending from the document tray to the ejecting tray through an image read position; an image reading device configured to read image information from each of the document sheets passing through the image read position; an exterior panel covering a region of the document feed path including the image read position from outside; a first open/close member forming a region of the exterior panel including a portion opposed to the image read position; and a second open/close member positioned inwardly of the first open/close member to define a region of the document feed path including the image read position, the first and second open/close members being supported at respective different fulcrums for opening/closing movement about respective shafts extending perpendicularly to the document feed direction.

The foregoing and other features and attendant advantages of the present invention will become more apparent from the reading of the following detailed description of the invention in conjunction with the accompanying drawings.

DETAILED DESCRIPTION OF THE INVENTION

Hereinafter, a document reader according to an embodiment of the present invention will be described in detail with reference to the accompanying drawings.

Figure 1:
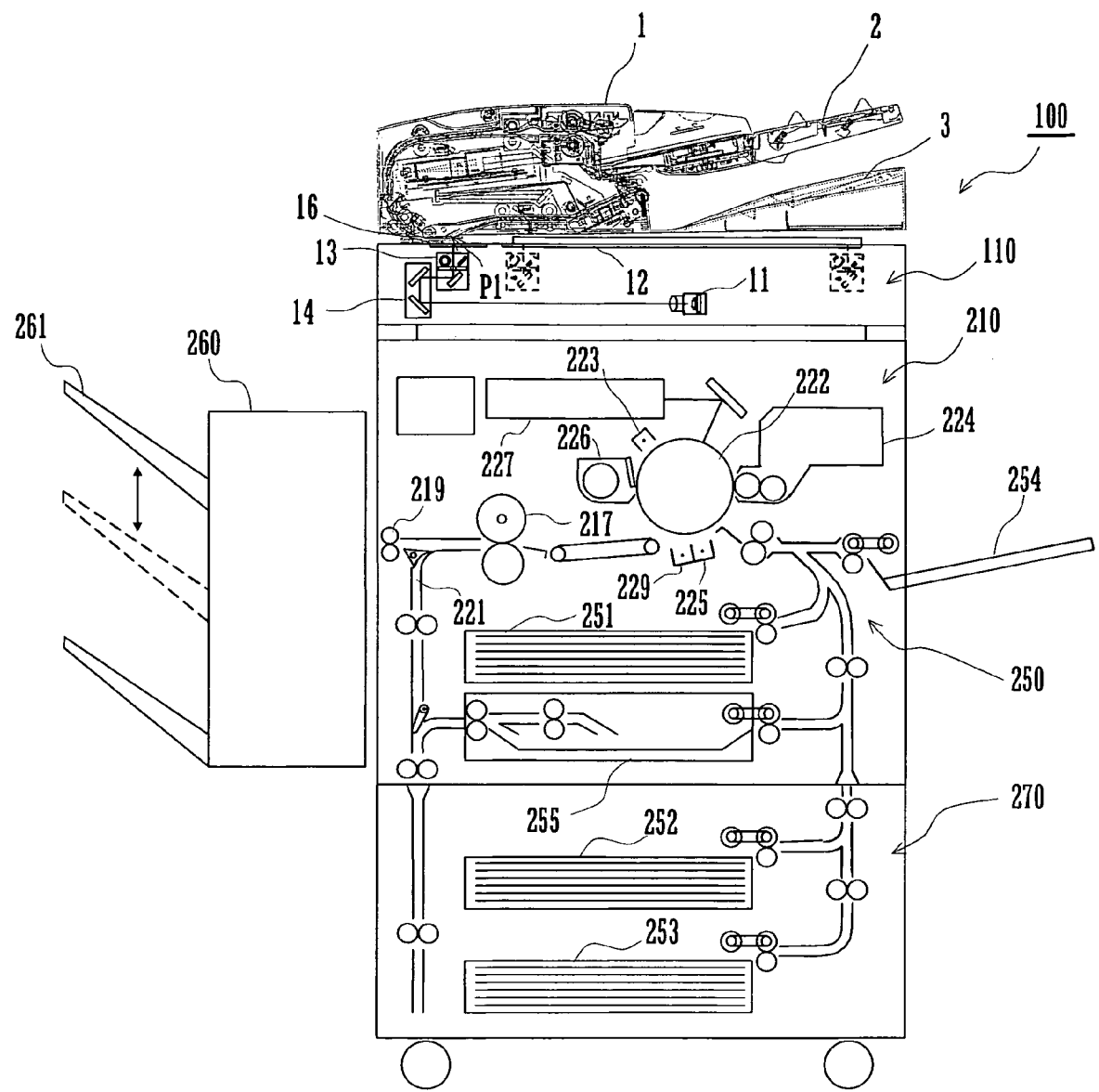
FIG. 1 is a view showing the construction of an image forming apparatus 100 provided with a document reader 1 according to an embodiment of the present invention.

FIG. 1 is a view showing the construction of image forming apparatus 100 according to an embodiment of the present invention. The image forming apparatus 100 includes an image read section 110 comprising an image reader 1 according to the present invention, an image forming section 210, and a sheet feed section 250 and is provided with a post-processing device 260 and a multi-tier sheet feeder unit 270.

Image data read from a document by the image read section 110 is transferred to the image forming section 210. The image data thus transferred is subjected to predetermined image processing in an image processing section of the image forming section 210 and then temporarily stored in memory incorporated in the image processing section. In response to an instruction to output the stored image data, the image data is read out of the memory.

The image forming section 210 includes a rotatably supported photoreceptor drum 222, and, around the photoreceptor drum 222, an electrostatic charger 223, a laser write unit 227, a developing device 224, a transfer device 225, a peeler 229, and a cleaner 226.

The electrostatic charger 223 is configured to charge the surface of the photoreceptor drum 222 to a predetermined potential. The laser write unit 227 is configured to form an electrostatic latent image on the surface of the photoreceptor drum 222 by irradiating the surface of the photoreceptor drum 222 with laser light modulated according to image data. The developing device 224 is configured to supply toner onto the electrostatic latent image formed on the photoreceptor drum 222 to develop the latent image into a visible toner image. The transfer device 225 is configured to transfer the toner image formed on the surface of the photoreceptor drum 222 to a recording sheet. The peeler 229 is configured to release the recording sheet from the surface of the photoreceptor drum 222. The cleaner 226 is configured to collect excess toner.

Instead of the laser write unit 227, use may be made of an optical write head of the solid state scanning type employing a light-emitting device array comprising LEDs, ELs or the like.

Below the image forming section 210 is located the sheet feed section 250 which comprises a recording sheet tray 251, a manual feed tray 254 and a reversing unit 255. The multi-tier sheet feed unit 270 includes sheet feed trays 252 and 253. The sheet feed section 250 defines a sheet feed path for transporting a recording sheet fed from any one of the trays 251 to 254 to an ejected-sheet tray 219 via a transfer position between the photoreceptor drum 222 and the transfer device 225 in the image forming section 210.

The reversing unit 255 communicates with a switchback path 221 for turning a recording sheet front side back for formation of an image on the reverse side of the sheet. The reversing unit 255 is replaceable with a normal sheet tray. The image forming apparatus 100 can be fitted with a large-capacity sheet feed unit capable of holding several thousands of recording sheets.

On the ejection side of the image forming section 210 are provided a fixing unit 217, the switchback path 221, and the post-processing device 260. The fixing unit 217 is configured to fix a toner image to a recording sheet by heating and pressurizing the recording sheet bearing the toner image transferred thereto. The switchback path 221 is configured to turn a recording sheet front side back for the formation of an image on the reverse side of the sheet. The post-processing device 260 is provided with an up-and-down tray 261 and performs stapling or other processing on recording sheets bearing respective images formed thereon. Each recording sheet bearing a toner image fixed thereto by the fixing unit 217 is guided to the post-processing device 260 by an ejection roller 219 optionally through the switchback path 221, subjected to predetermined post-processing, and then ejected to the up-and-down tray 261.

The image read section 110 includes a CCD (Charge Coupled Device) read unit 11 and is configured to perform image reading by using a light source unit 13 and a mirror unit 14 to focus an image of a document sheet placed flat on a first platen 12 onto the CCD read unit 11 located at a fixed position. The CCD read unit 11 includes an imaging lens 11A and a CCD image sensor corresponding to the image reading device defined by the present invention.

The light source unit 13 includes a light source for emitting document-illuminating light, a reflector for gathering document-illuminating light emitted from the light source at a predetermined image read position on the first platen 12, a slit allowing only reflected light from the document sheet to pass therethrough, and a mirror for deflecting the optical path of the reflected light having passed through the slit by 90°. The mirror unit 14 includes a pair of mirrors for deflecting the optical path of light from the light source unit 13 by 180°.

In a stationary document read mode, the light source unit 13 and the mirror unit 14 reciprocate below the first platen 12 in the secondary scanning direction at a predetermined velocity of V and a velocity of V/2, respectively, thereby guiding reflected light from the entire image bearing surface of the document sheet on the first platen 12 to the CCD read unit 11 with the optical path length kept constant.

The CCD read unit 11 may be structured to reciprocate a unit of an optical read system for reduced-size reading or actual-size reading comprising a CCD image sensor, an imaging lens and a light source below the first platen 12 in the secondary scanning direction at a velocity of V when in the stationary document read mode.

The image read section 110 further includes a second platen 16 spaced a predetermined distance apart from the first platen 12 in the secondary scanning direction. In a feed-and-read mode in which the document reader 1 is used, the light source unit 13 is held stationary at image read position P1 opposed to the second platen 16.

Figure 2:
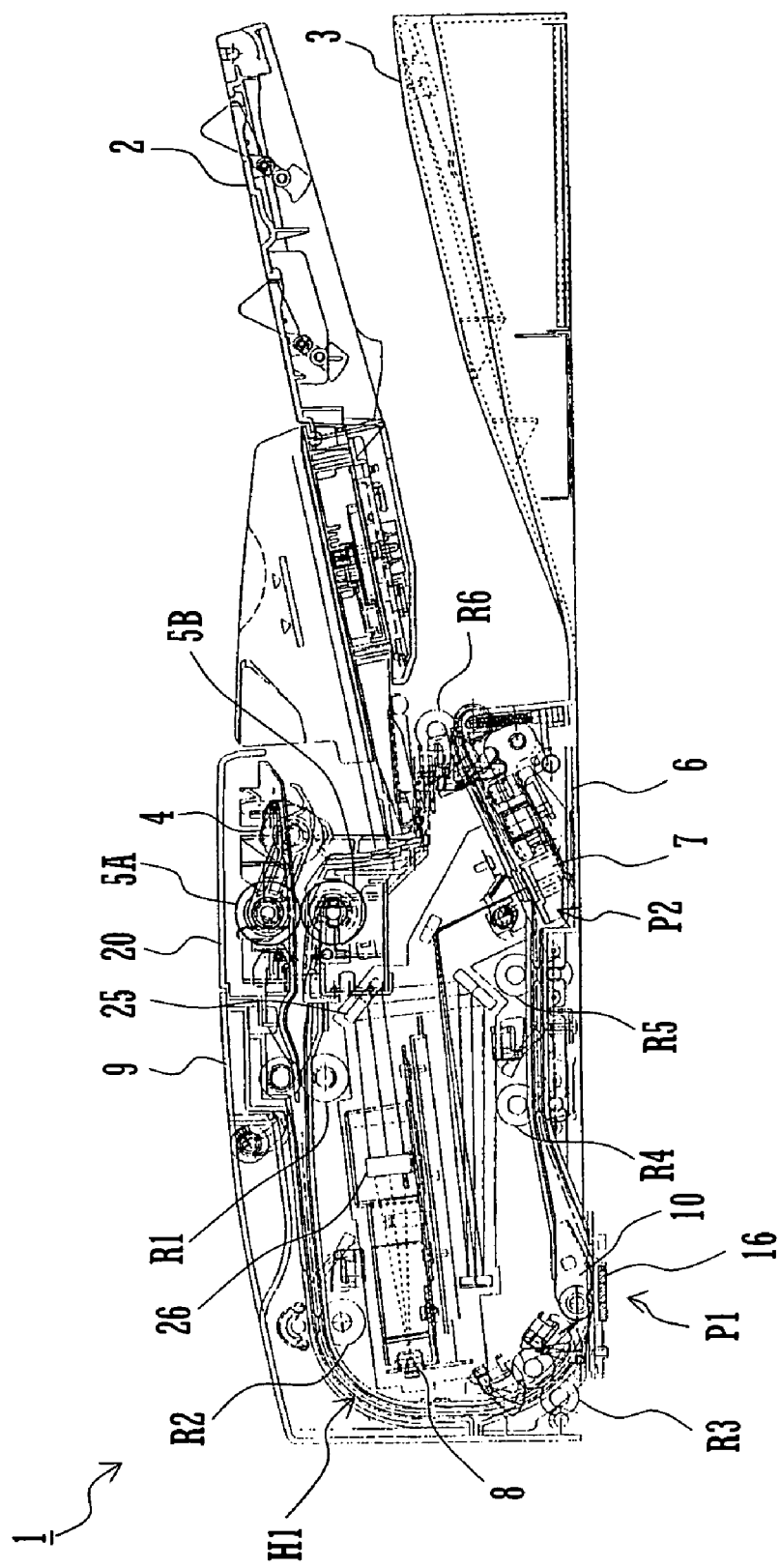
FIG. 2 is a sectional view showing the construction of the document reader 1.
Figure 3:
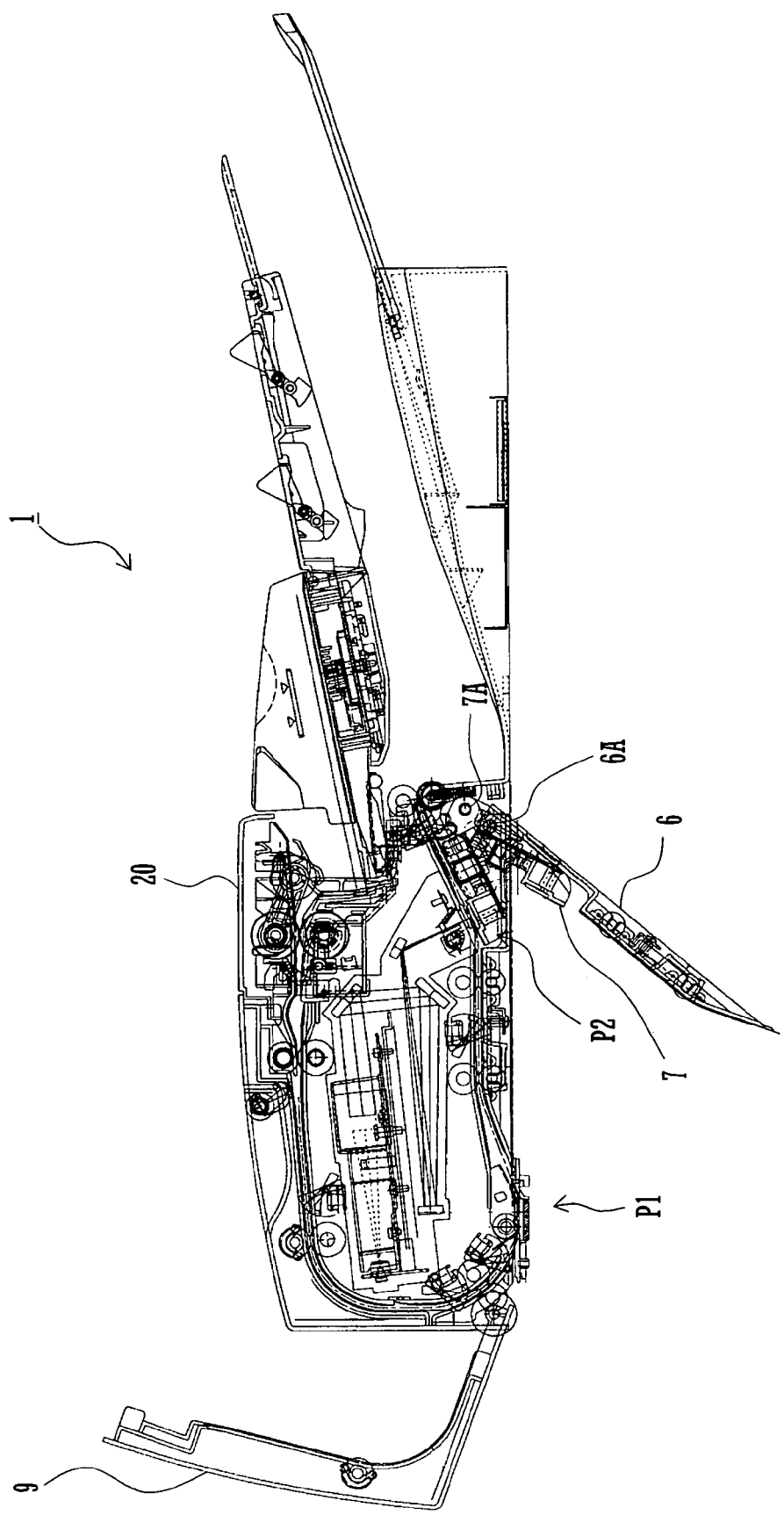
FIG. 3 is a sectional view of the document reader 1 with its cover open.

FIG. 2 is a sectional view showing the construction of the document reader 1. FIG. 3 is a sectional view showing an outward appearance of the document reader 1 with its cover open. The document reader 1 is positioned above the image read section 110 so as to be capable of covering and exposing the top surfaces of the first and second platens 12 and 16.

The document reader 1 includes a document tray 2 and an ejecting tray 3. The document tray 2 holds plural document sheets as stacked thereon. The ejecting tray 3 receives, as stacked thereon, document sheets finished with image information reading. A substantially C-shaped document feed path H1 is defined to extend from the document tray 2 to the ejecting tray 3 through first and second image read positions P1 and P2. The document feed path H1 is provided with a pickup roller 4, a feed roller 5A, a separating roller 5B, and rollers R1 to R6.

The rollers R1, R2, R4 and R5 are transport rollers for transporting each document sheet on the document feed path H1 at a predetermined velocity. The roller R3 starts rotating synchronously with image information reading at each of the first and second image read positions P1 and P2. The document sheet fed from the document tray 2 before the image read timing becomes abutted at its leading edge against the roller 3 kept stationary for skew correction and is then transported to the image read position P1 or P2 with predetermined image read timing by the roller R3 starting rotation. The roller R6 ejects the document sheet finished with image information reading onto the ejecting tray 3.

In the document feed path H1 is disposed a platen 10 at the first image read position P1 opposed to the second platen 16 of the image forming apparatus 100. The platen 10 is spaced a predetermined clearance apart from the second platen 16. During passage of each document sheet through the first image read position P1 between the second platen 16 and the platen 10, the CCD read unit 11 included in the image read section 110 of the image forming apparatus 100 reads image information from the obverse side of the document sheet.

In the document feed path H1 is disposed platen glass 21 above the second image read position P2 (corresponding to the image read position defined by the present invention) located downstream of the first image read position P1. Further, an internal space surrounded by the document sheet path H1 within the document reader 1 accommodates therein the CCD 8 corresponding to the image reading device defined by the present invention together with mirrors 22 to 25 and lens 26. The CCD 8 is opposed to the second image read position P2 via the mirrors 22 to 25, lens 26 and platen glass 21. During passage of each document sheet through the second image read position P2 between the second platen 16 and the platen 10, the CCD 8 reads image information from the reverse side of the document sheet.

In a one-side document read mode for reading image information from only one side of each document sheet, a document sheet is paid out by rotation of the pickup roller 4 abutting against the topmost surface of a stack of document sheets placed on the document tray 2 and then guided into the document feed path H1 by rotation of the feed roller 5A. At that time, the separating roller 5B rotating in the same direction as the feed roller 5A pushes back document sheets other than the topmost document sheet onto the document tray 2, so that only the topmost document sheet is fed into the document feed path H1.

The document sheet fed from the document tray 2 is transported on the document feed path H1 by the transport rollers R1 and R2 rotating and fed toward the image read position P1 with predetermined timing by rotation of the roller 3. As the document sheet passes through the image read position P1, image information is read from the obverse side of the document sheet by the CCD read unit 11 of the image read section 110 including the light source unit 13 held stationary below the first image read position P1. The document sheet having been subjected to image information reading from the obverse side thereof is delivered onto the ejecting tray 3 by the transport rollers R4 to R6 rotating.

In a double-side document read mode for reading image information from the both sides of each document sheet, a single document sheet fed into the document feed path H1 is subjected to image information reading from the obverse side thereof at the first image read position P1 as in the one-side document read mode, and then guided to the second image read position P2 by the rollers R4 and R5. During passage of the document sheet through the second image read position P2, the CCD 8 reads image information from the reverse side of the document sheet. The document sheet finished with image information reading from its both sides is delivered onto the ejecting tray 3 by the roller R6 rotating.

In the document reader 1 the document feed path H1 is covered with an exterior panel 20. Portions of the exterior panel 20 which face the upper side and the left-hand side, respectively, of the document feed path H1 constitute a cover 9. The cover 9 is hinged at its lower end portion on the left-hand side in FIG. 2 so as to be openable and closable. A substantially L-shaped transport guide is fixed integrally with the cover 9 so as to extend over the upper side and left-hand side of the document feed path H1.

A portion of the exterior panel 20 that forms a bottom surface of the document reader 1 includes a portion facing a lower side of the document feed path H1 and comprising a first open/close member 6. The first open/close member 6 is supported at a fulcrum 6A so as to be openable downwardly of the document reader 1 about a shaft extending perpendicularly to the sheet feed direction. A second open/close member 7 is positioned inwardly of the first open/close member 6 within the document reader 1. The second open/close member 7 is supported at a fulcrum 7A so as to be openable downwardly of the document reader 1 about a shaft extending perpendicularly to the sheet feed direction.

Figure 4:
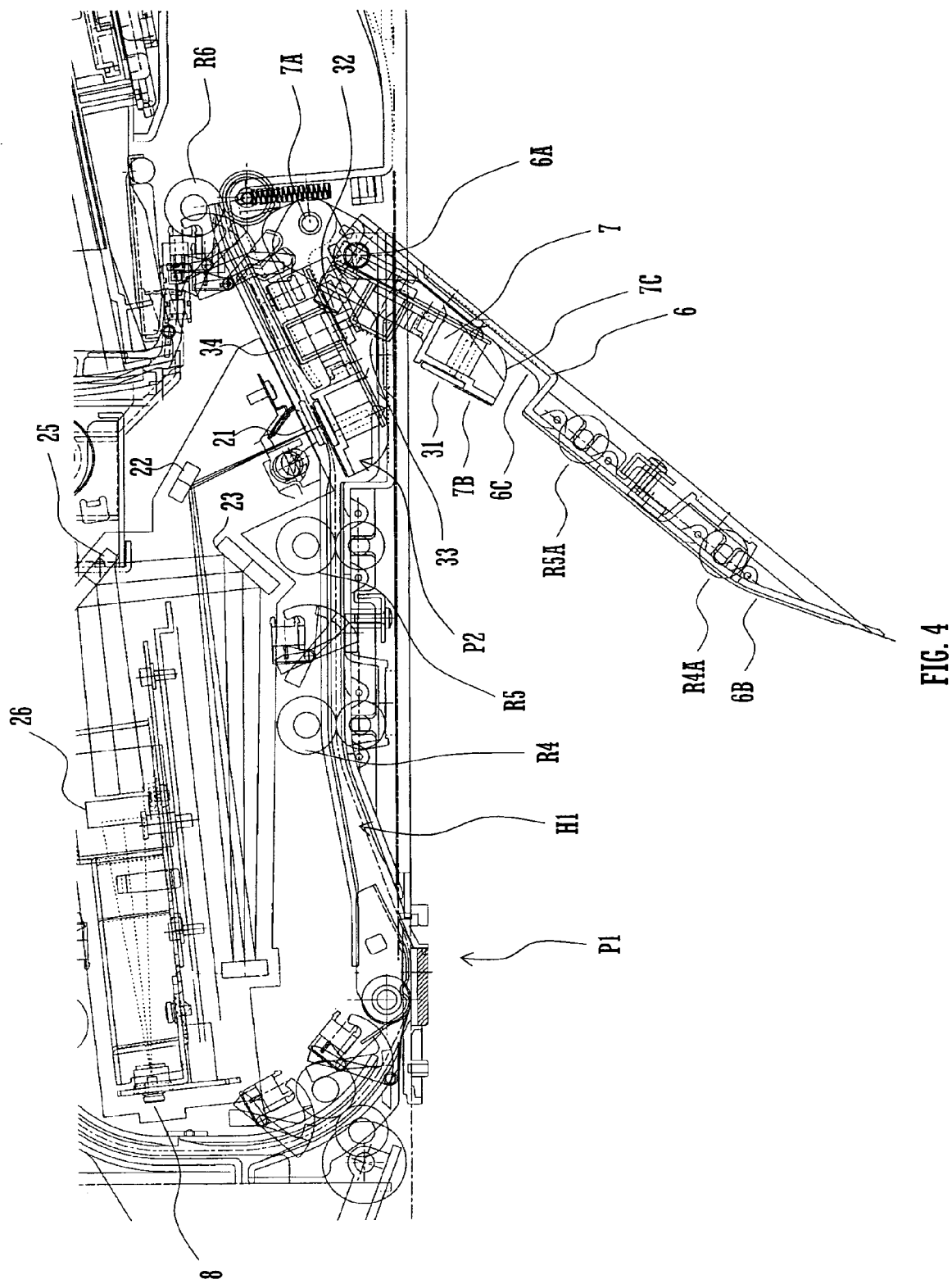
FIG. 4 is an enlarged sectional view showing the structure of a portion of concern of the document reader 1.

FIG. 4 is an enlarged sectional view showing the structure of a portion of concern of the document reader 1. The first open/close member 6 constitutes a region of the exterior panel 20 forming the bottom surface of the document reader 1 and facing a portion of the document feed path H1 including the second image read position P2. The first open/close member 6 is pivotally supported at the fulcrum 6A.

The first open/close member 6 supports rollers R4A and R5A pressing against the rollers R4 and R5, respectively, and is formed with a transport guide 6B and an abutment portion 6C. At least the transport guide 6B and abutment portion 6C of the first open/close member 6 are each formed of a plate member comprising an elastic material such as resin. The transport guide 6B defines an outer side of the document feed path H1 in a region of the document feed path H1 extending from a downstream side of the first image read position P1 to a downstream side of the roller R5. A free end of the second open/close member 7 to be described later abuts against the abutment portion 6C from above.

Within the document reader 1, a portion of the document feed path H1 including the second image read position P2 is constituted of the second open/close member 7 positioned inwardly of the first open/close member 6. The second open/close member 7 is pivotally supported at the fulcrum 7A.

The second open/close member 7 is formed with a transport guide 7B and a positioning member 33 and holds a shading correction plate 31 and a marking member 32. The transport guide 7B defines a lower side of the document feed path H1 in a region of the document feed path H1 extending from a downstream side of the roller R5 to a downstream side of the second image read position P2.

The positioning member 33 abuts a transport guide 34 fixed within the document reader 1 in such a direction as to close the second open/close member 7. The transport guide 34 defines a lower side of the document feed path H1 in a region of the document feed path H1 extending from a downstream side of the second image read position P2 to an upstream side of the roller R6.

The marking member 32 stamps a mark on a portion of each document sheet finished with image information reading. According to whether or not a portion of the surface of a document sheet is stamped with the mark by the marking member 32, judgment is made as to whether or not the document sheet has been finished with image information reading. A corner portion 7C forming a lower portion of the free end of the second open/close member 7 is rounded and abuts against the contact portion 6C of the first open/close member 6 from above.

As described above, the document reader 1 according to this embodiment has the double open/close member comprising the first and second open/close members 6 and 7 for exposing and covering the region of the document feed path H1 including the second image read position P2.

Accordingly, the document reader 1 is capable of sufficiently shielding the second image read position P2 from extraneous light, preventing inclusion of noise due to stray light into image information read from a document sheet by the CCD 8 opposed to the second image read position P2 via the mirrors 22 to 25, lens 26 and the like, and reading image information from the document sheet precisely.

Also, it is not possible that an external force working on the first open/close member 6 forming part of the exterior panel 20 exerts a direct influence upon the region of the document feed path H1 including the second image read position P2 and covered by the second open/close member 7. Hence, the document reader 1 can ensure a constant precision in positioning each document sheet under feeding at the second image read position P2.

In the document feed direction along the document feed path H1, the first open/close member 6 is longer than the second open/close member 7 and the fulcrum 7A of the second open/close member 7 is located outside the first open/close member 6. Accordingly, the free end of the second open/close member 7 necessarily faces an inside surface of the first open/close member 6. For this reason, when both the first and second open/close members 6 and 7 are closed, the free end of the second open/close member 7 necessarily abuts against the contact portion 6C of the first open/close member 6, thus preventing extraneous light from reaching the second image read position P2 from the free end 7C of the second open/close member 7, whereby the second image read position P2 can be shielded from extraneous light more reliably.

The shading correction plate 31 and the marking member 32 are required to be positioned in the document feed path H1 with high precision. Since the shading correction plate 31 and marking member 32 are disposed on the second open/close member 7, which is positioned inwardly of the first open/close member 6 within the document reader 1 and hence is not likely to undergo an influence of external force, the precision in positioning the shading correction plate 31 and marking member 32 is not likely to lower.

Since the rounded free end 7C of the second open/close member 7 abuts against the plate-shaped contact portion 6C of the first open/close member 6 which comprises the elastic material, even if the first open/close member 6 is fitted to the document reader 1 with an error, the abutment portion 6C is elastically deformed to prevent the second open/close member 6 from being displaced in the closed condition. Thus, it is possible to prevent a focal shift from occurring due to variations in the distance between the document sheet and the CCD 8, thereby to ensure precise image information reading from each document sheet.

The foregoing embodiments are illustrative in all points and should not be construed to limit the present invention. The scope of the present invention is defined not by the foregoing embodiment but by the following claims. Further, the scope of the present invention is intended to include all modifications within the meanings and scopes of claims and equivalents.

What is claimed is:

1. A document reader comprising:
    a document tray for holding thereon document sheets to be subjected to image information reading therefrom;
    an ejecting tray for receiving the document sheets after the image information reading therefrom;
    a document feed path extending from the document tray to the ejecting tray through an image read position;
    an image reading device configured to read image information from each of the document sheets passing through the image read position;
    an exterior panel covering a region of the document feed path including the image read position from outside;
    a first open/close member forming a region of the exterior panel including a portion opposed to the image read position; and
    a second open/close member positioned inwardly of the first open/close member and below an image reading portion of the image reading device to define a region of the document feed path including the image read position, the first and second open/close members being supported at respective different fulcrums for opening/closing movement about respective shafts extending perpendicularly to the document feed direction.

2. The document reader according to claim 1, wherein the first open/close member is longer than the second open/close member in the document feed direction along the document feed path, while the fulcrum of the second open/close member is positioned inwardly of the fulcrum of the first open/close member within a document reader body and outside the first open/close member in the document feed direction.

3. The document reader according to claim 1, wherein the first open/close member and the second open/close member open or close in a same direction.

4. A document reader, comprising:
    a document tray for holding thereon document sheets to be subjected to image information reading therefrom;
    an ejecting tray for receiving the document sheets after the image information reading therefrom;
    a document feed path extending from the document tray to the ejecting tray through an image read position;
    an image reading device configured to read image information from each of the document sheets passing through the image read position;
    an exterior panel covering a region of the document feed path including the image read position from outside;
    a first open/close member forming a region of the exterior panel including a portion opposed to the image read position; and
    a second open/close member positioned inwardly of the first open/close member to define a region of the document feed path including the image read position, the first and second open/close members being supported at respective different fulcrums for opening/closing movement about respective shafts extending perpendicularly to the document feed direction,
    wherein the first open/close member forms a portion of the exterior panel situated on a bottom side of a document reader body and is configured to open/close an inside of the exterior panel downwardly.

5. The document reader according to claim 4, wherein the first open/close member covers the second open/close member from below the second open/close member.

6. The document reader according to claim 4, wherein the first open/close member is longer than the second open/close member in the document feed direction along the document feed path, while the fulcrum of the second open/close member is positioned inwardly of the fulcrum of the first open/close member within a document reader body and outside the first open/close member in the document feed direction.

7. The document reader according to claim 4, wherein the first open/close member and the second open/close member open or close in a same direction.

8. A document reader, comprising:
    a document tray for holding thereon document sheets to be subjected to image information reading therefrom;
    an ejecting tray for receiving the document sheets after the image information reading therefrom
    a document feed path extending from the document tray to the ejecting tray through an image read position;

an image reading device configured to read image information from each of the document sheets passing through the image read position;

an exterior panel covering a region of the document feed path including the image read position from outside;

a first open/close member forming a region of the exterior panel including a portion opposed to the image read position; and a second open/close member positioned inwardly of the first open/close member to define a region of the document feed path including the image read position, the first and second open/close members being supported at respective different fulcrums for opening/closing movement about respective shafts extending perpendicularly to the document feed direction, wherein the first open/close member includes a resilient plate member having a transport guide forming part of the document feed path and a contact portion abutting a free end of the second open/close member.

9. A document reader, comprising:

a document tray for holding thereon document sheets to be subjected to image information reading therefrom;

an ejecting tray for receiving the document sheets after the image information reading therefrom;

a document feed path extending from the document tray to the ejecting tray through an image read position;

an image reading device configured to read image information from each of the document sheets passing through the image read position;

an exterior panel covering a region of the document feed path including the image read position from outside;

a first open/close member forming a region of the exterior panel including a portion opposed to the image read position; and a second open/close member positioned inwardly of the first open/close member to define a region of the document feed path including the image read position, the first and second open/close members being supported at respective different fulcrums for opening/closing movement about respective shafts extending perpendicularly to the document feed direction, wherein the second open/close member is provided with a shading correction plate facing the image reading device at the image read position, a marking member configured to stamp a check mark on each of the document sheets to be delivered onto the ejecting tray, and a positioning member abutting a portion of a document reader body in such a direction as to close the second open/close member.

10. A document reader, comprising:

a document tray for holding thereon document sheets to be subjected to image information reading therefrom;

an ejecting tray for receiving the document sheets after the image information reading therefrom;

a document feed path extending from the document tray to the ejecting tray through an image read position;

an image reading device configured to read image information from each of the document sheets passing through the image read position;

an exterior panel covering a region of the document feed path including the image read position from outside;

a first open/close member forming a region of the exterior panel including a portion opposed to the image read position; and a second open/close member positioned inwardly of the first open/close member to define a region of the document feed path including the image read position, the first and second open/close members being supported at respective different fulcrums for opening/closing movement about respective shafts extending perpendicularly to the document feed direction, wherein a fulcrum of the first open/close member and a fulcrum of the second open/close member are provided at a downstream of the image reading device with respect to the document feed path.

* * * * *